United States Patent [19]

Przytulla et al.

[11] 4,422,839

[45] Dec. 27, 1983

[54] EXIT DIE

[75] Inventors: Dietmar Przytulla, Sindorf; Manfred Lehmann, Cologne, both of Fed. Rep. of Germany

[73] Assignee: Mauser-Werke GmbH, Bruhl, Fed. Rep. of Germany

[21] Appl. No.: 320,481

[22] Filed: Nov. 12, 1981

[30] Foreign Application Priority Data

Nov. 15, 1980 [DE] Fed. Rep. of Germany ....... 3043204

[51] Int. Cl.³ .............................................. B29D 23/04
[52] U.S. Cl. .................................... 425/465; 264/167; 264/209.2; 264/541; 425/380; 425/381; 425/466; 425/467
[58] Field of Search ............... 425/465, 466, 467, 380, 425/381; 264/167, 209.1, 209.2, 541, DIG. 33

[56] References Cited

U.S. PATENT DOCUMENTS

| | | | |
|---|---|---|---|
| 3,078,507 | 2/1963 | Park | 264/541 |
| 3,205,534 | 9/1965 | Langecker | 425/466 |
| 3,281,896 | 11/1966 | Meyer et al. | 425/466 |
| 3,309,443 | 3/1967 | Scott, Jr. et al. | 264/541 |
| 3,355,769 | 12/1967 | Fogelberg | 425/466 |
| 3,453,690 | 7/1969 | Mayner | 425/381 |
| 3,909,183 | 9/1975 | Hsu | 425/466 |
| 3,985,490 | 10/1976 | Kader | 425/466 |
| 4,124,351 | 11/1978 | Garbuio | 425/466 |
| 4,171,195 | 10/1979 | Klein et al. | 425/466 |
| 4,279,857 | 7/1981 | Feuerherm | 425/466 |

FOREIGN PATENT DOCUMENTS

| | | | |
|---|---|---|---|
| 1479967 | 8/1970 | Fed. Rep. of Germany | 425/466 |
| 2823999 | 5/1979 | Fed. Rep. of Germany | 425/467 |
| 1385115 | 11/1964 | France | |

*Primary Examiner*—Jeffery R. Thurlow
*Attorney, Agent, or Firm*—Pennie & Edmonds

[57] ABSTRACT

An annular exit die for an extrusion head of the type having a die casing ring and a tapered die core cooperating to form an annular die gap or orifice for fabricating a hollow extrudate of thermoplastic material. The tapered die core is adjustable in the axial direction and changes the radial cross-sectional dimension of the die gap as a function of its position. The casing ring has a lower end and an inner wall defining the outer boundary of the die gap. The wall has a step at the lower end of the ring. The step has an inner radially undulating circumferential profile and a radially undulating edge defining the boundary between the step and the lower end of the casing ring. The inner wall of the ring also has another step disposed radially inwardly of the first-mentioned step. This step has an inner radially symmetrical profile and a radially symmetrical edge defining the boundary between the two steps. The ring steps independently define the outer boundary of the die gap as a function of the relative axial positions of the casing ring and die core. Axial movement of the tapered die core varies the cross-sectional dimension of the die gap both uniformly about the circumference of the gap and at localized points therearound.

8 Claims, 4 Drawing Figures

EXIT DIE

BACKGROUND OF THE INVENTION

1. Field of the Invention

The invention relates to an annular exit die for an extrusion head for fabricating a tubular extrudate of thermoplastic material and having a tapered core and die casing ring cooperating to form an annular die gap or orifice. The cross-sectional dimension of the die gap is uniformly enlarged or diminished by moving the tapered die core axially over a prescribed distance and the cross-sectional dimension of the gap is further changed at prescribed points about its circumference by further axial movement of the die core.

2. Description of the Prior Art

Extrusion heads have been developed in which the die cross-section can be changed at prescribed points in a circumferential direction about the die gap in order to obtain a specific distribution of wall thickness in the hollow extrudate material. When larger hollow bodies, such as barrels are fabricated, the hollow extrudate is extruded into a segmented blow mold cavity. The lower end of the extrudate is pulled over blow pins which are spread apart before the mold segments begin to clamp. As a result of the pulling action and the elasticity of the extrudate material, the lower end of the extrudate has a varied thickness.

When the mold segments clamp together, the hollow extrudate is squeezed along the plane of the mold division on the top and on the bottom of the cavity and is welded. The hollow extrudate is then blown into the mold shape and contacts the inner surface of the mold. During the molding process, the hollow extrudate must traverse different stretch paths at different points along its circumference and at the upper and lower clamping points, i.e., at the mold separation steam. As a result of the extrudate stretching, the wall of the finished blown hollow body will have a thickness that varies as a function of extrudate material stretch. In cylindrical hollow blow molded bodies, these differences in wall thickness are particularly noticeable in the end walls which have a maximum thickness in the neighborhood of the mold separation seam and a minimum thickness in the zones which are circumferentially furthest away from the mold separation seam.

At the outer ends of the mold separation seam as they extend across the top and bottom of the mold the material almost contacts the inner contour of the mold, and thus undergoes a very little stretch. However, at the zones spaced 90° from the mold separation seam, the material must be stretched over the entire radius of the hollow body to form the top and bottom of the hollow body and to come into contact with the interior side wall of the mold. In the blow molding process, blown air used to stretch the extrudate acts everywhere in the mold under the same pressure. Therefore the extrudate material does not flow from thick wall points where only a little stretching takes place to thin wall points where more pronounced stretching takes place.

For these reasons, the hollow extrudate must have sufficiently thick walls throughout such that the weakest points in the finished blown hollow body product will still have sufficient stability. This entails the use of more thermoplastic material than for a blown hollow body having uniform wall thickness. It also necessitates longer cooling times for the molding process and consequently entails production inefficiency.

The teachings of French Pat. No. 1,385,115 sought to solve the problem of changes of wall thickness in the hollow extrudate by changing the die gap during the extrusion process. The die core, which was movable in the axial direction with respect to the die casing, had an essentially cylindrical shape. Beginning at half its length, the die core had flattened sections along two opposite sides, which dropped down diagonally toward the inside and bottom of the die core. The cylinder wall disposed in the area between the flattened sections remained constant, so that the die gap in these areas could never change regardless of the setting of the die core.

The above device was suitable only for producing relatively small hollow bodies, since large hollow bodies require a capability for adjusting the extruding die to change the extrudate thickness along its circumference or along its length. For example, when extruding a long hollow extrudate in a vertical downward direction, the wall thickness of the hollow extrudate stretches under its own weight. To compensate for the extrudate stretching under its own weight the die gap is widened by appropriately changing the relative axial positions of the die core and the die casing. The reduction of wall extrudate material thickness due to stretching is accordingly balanced out by the addition of more material.

The above described device does not provide for increasing the die gap as a function of the length of extrudate material, since the die core has only the partial displacement capability at the flattened sections.

In order to vary die gap thickness without any deformation of die components, German GM No. 79 32 422 disclosed that the cross-section of the die opening can be partially changed at prescribed points by a positioning ring that is movable with respect to the extrusion head along the axial direction of the latter. If the end surface of the die casing in the circumferential direction is radially symmetrical, the horizontal lower end surface of the positioning ring forms an undulating, wave-like pattern. Conversely, if the horizontal end surface of the die casing forms an undulating pattern, the horizontal lower end surface of the positioning ring is radially symmetrical. At the points where the die opening crosses the separation seam of the blow mold, an undulation peak constricts the die gap cross-section corresponding to the setting of the positioning ring. Beginning at the area of the mold separation seam, this peak constantly decreases to a die gap circumferential angle of 90°. From there, it steadily rises again to the top of the following undulation peak. The undulation wave trough bottoms leave open the full cross-section of the die gap opening.

With such a device, both the die core and the die casing ring, or respectively the positioning ring, had to be designed so that they were mutually adjustable in height. This meant that relatively complex displacement motions between the die core, die casing ring, and positioning ring had to occur during the extrusion process. This required a comparatively expensive component displacement mechanism. It is indeed possible to displace the die core without much difficulty. However, an additional displacement device is necessary for the die casing ring and/or the special positioning ring.

SUMMARY OF THE INVENTION

An exit die is provided with an outer casing ring having a lower end. In accordance with the teachings of the present invention, the casing ring has an inner wall that defines the outer boundary of the die gap. The inner wall has an outer or first step at the lower end of the die casing ring and an inner or second step disposed radially inwardly of the first step. The outer step has an inner radially undulating circumferential profile while the inner step has an inner radially symmetrical profile. An inner step edge having a radially symmetrical profile lies between the inner step and the outer step and defines the boundary between the two steps. An outer step edge having a radially undulating profile lies between the outer step and the lower end of the die casing ring and defines the boundary between the outer step and the end of the ring.

The lower edge surface of the die core defines the inner boundary of the annular die gap and the ring bore steps define the outer boundary of the annular die gap whereby axial movement of the tapered die core varies both the thickness and the outer boundary profile of the extrudate.

DESCRIPTION OF THE PREFERRED EMBODIMENTS

Figure 1:
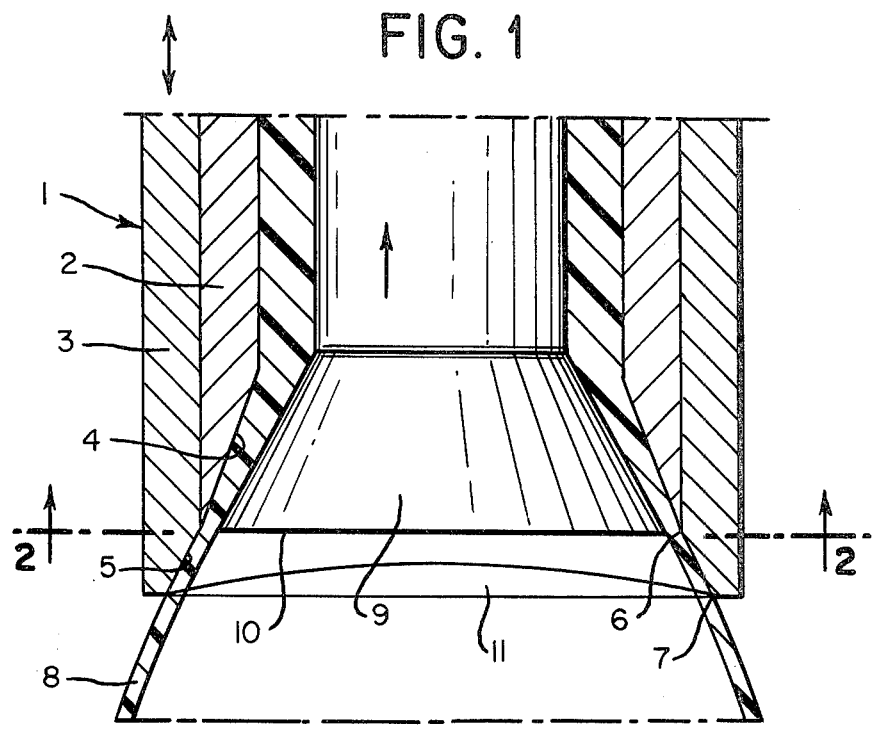
FIG. 1 is a partial cross-sectional elevational view of the exit die with the die core moved towards the top of its axial travel.

The die casing ring 1 comprises two shells 2 and 3. Shell 2 is coaxially nested inside shell 3. Inner shell 2 is rigidly fastened to the housing (not shown in the drawing) of the extrusion head, while the outer shell 3 is adjustable in different axial positions relative to shell 2. Shell 2 has a set-back tapered inner step 4 on the lowermost portion of the shell. The angle of taper of step 4 is about equal to the angle taper of the opposed die core. Step 4 has an inner radially symmetrical, flat profile and an inner step edge 6 at the lower end of the step. As shown in FIG. 1, the step edge 6 lies in a plane extending at right angles to the center vertical axis of the die and has a diameter slightly greater than the maximum greater of the die core.

Shell 3 has an outer tapered step 5 at its lowermost portion. The angle of taper of step 5 is greater than the angle of taper of step 4. Step 5 has an inner radially undulating contour 11 in the direction of the die circumference and a radially undulating contoured step edge 7. As shown at 11 in FIGS. 1 and 3, the undulating contour extends from the step edge 7 part way up the step 5 toward the inner step 4 of the shell 2. The wall thickness of the hollow extrudate 8 is changed at prescribed circumferential points through this undulated end boundary formed by the step edge 7 of the shell 3, as a function of the axial height adjustment of the die core 9.

Figure 2:
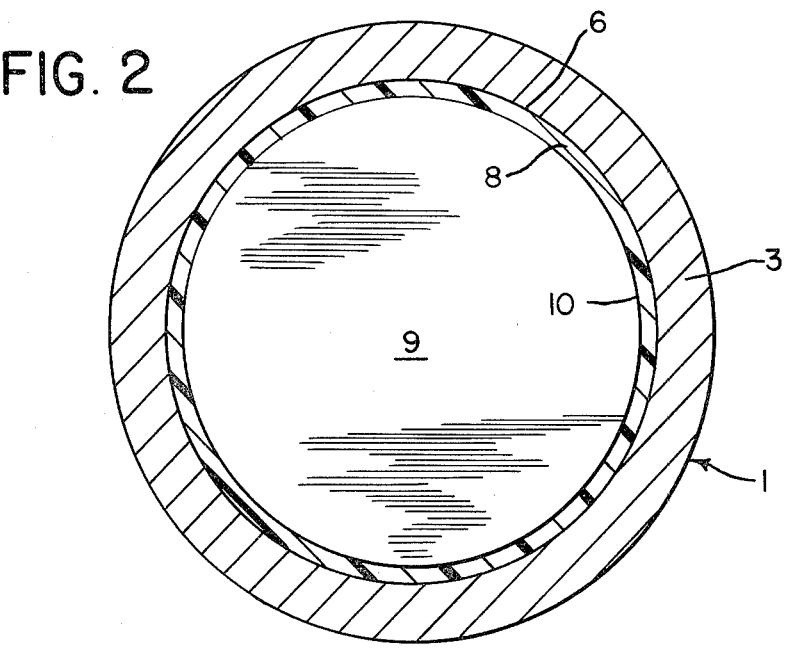
FIG. 2 is a sectional view taken along line 2—2 of FIG. 1.

The uniform enlargement or reduction of the die gap and consequently the general uniform adjustment of the wall thickness of the hollow tube material during the extrusion process takes place in the upper adjustment range of the die core 9 (FIGS. 1 and 2). Here, the lower edge 10 of the die core 9 forms the inner boundary of the die gap and the inner step edge 6 of the step surface 4 forms the outer boundary of the die gap.

Figure 3:
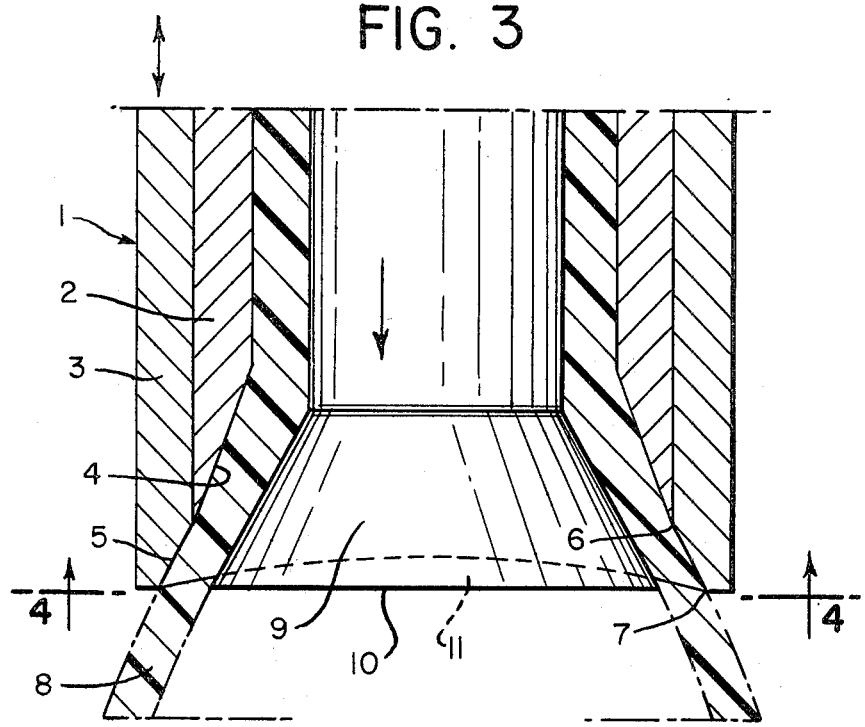
FIG. 3 is a partial cross-sectional elevational view of the exit die with the die core moved towards the bottom of its axial travel.

If the wall thickness of the hollow extrudate material 8 is to be changed at particular points about the extrudate's circumference, this is done by displacing the die core 9 axially downwardly as shown in FIG. 3. Here, the inner step of the shell 2 is overridden and the undulated outer edge 7 of shell 3, together with the lower edge 10 of the die core 9, determines the circumferential distribution of wall thickness in the hollow extrudate 8 in correspondence to the contour of step edge 7.

Figure 4:
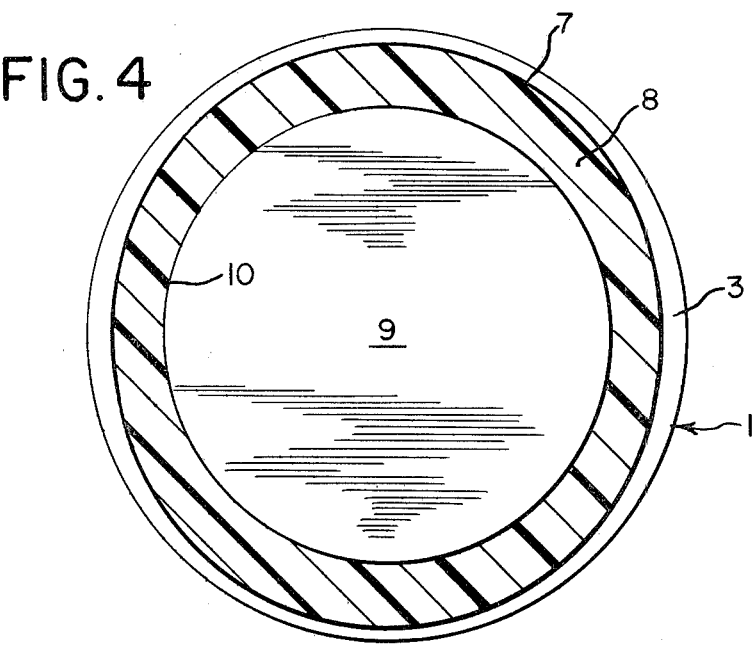
FIG. 4 is a section view taken along line 4—4 of FIG. 3.

The undulation peaks, that is those areas of the edge 7 of shell 3 which most constrict the tube wall, are situated to the left and right in FIGS. 3 and 4. The corrugation valleys and consequently the thickest wall areas of the extrudate correspondingly lie in the plane perpendicular thereto.

With the die casing ring constructed as described above, both uniform changes in the wall thickness of the extrudate as well as localized changes as specified points about its circumference can be effected solely by adjusting the axial position of the die core relative to the stepped die core ring.

The nesting of shells 2 and 3 facilitates easy fabrication of the die casing ring. In particular, it simplifies construction of the radially undulating contoured outer step. Furthermore, a number of contoured steps can be arranged one behind the other. Here, the contours either can correspond to one another or can have different designs. By arranging one behind the other, several contoured steps for making localized changes in the die gap at prescribed points allows specific reinforcement configurations for the extrudate material at particular points in the extruded tube.

We claim:

1. In an annular exit die for an extrusion head having a tapered die core and an outer casing ring concentrically disposed around the die core and cooperating with said die core to define an annular die gap for fabricating a hollow extrudate, the die core being tapered radially outwardly as measured in a direction toward the die gap, and wherein the radial width of the die gap varies upon relative axial movement between the die core and casing ring, the improvement wherein the casing ring comprises:
   (a) a lower end;
   (b) an inner wall defining the outer boundary of the die gap, said wall having:
      (1) a first step adjacent to the lower end of the die casing ring and having an inner radially undulating circumferential profile and a radially undulating first step edge defining the boundary between the first step and the lower end of the casing ring, and
      (2) a second radially inwardly disposed step adjacent to the first step and having an inner radially symmetrical profile and a radially symmetrical second step edge defining the boundary between the first step and the second step;
   (c) the ring steps independently defining the outer boundary of the die gap as a function of relative axial positions of the casing ring and die core;
   (d) said die core and the casing ring, with the first and second steps thereof, being axially movable with respect to each other to selectively position the die core in cooperating lateral alignment with the first and second steps; and (e) means for axially moving the die core and casing ring, with the first step and second step thereof, with respect to each other to selectively position the die core in cooperating lateral alignment with the first and second steps.

2. The exit die according to claim 1, wherein:
(a) the die casing ring steps are tapered radially outwardly as measured in a direction toward the die gap.

3. The exit die according to claim 2, wherein:
(a) the maximum diameter of the die core is slightly less than the diameter of the second step edge.

4. The exit die according to claim 3, wherein:
(a) the second step has a given angle of taper; and
(b) the first step has a greater angle of taper than the second step.

5. The exit die according to claim 4, wherein:
(a) the die core angle of taper is approximately equal to the angle of taper of the second step.

6. The exit die according to claim 5, wherein:
(a) the radially undulating profile of the first step only extends part way up said step from the first step edge toward the second step.

7. The exit die according to any one of claims 1-5, wherein the casing ring comprises:
(a) a pair of coaxially nested outer and inner shells,
  (1) the outer shell defines the first step and the first step edge and the lower end of the casing ring, and
  (2) the inner shell defines the second step and the second step edge.

8. The exit die according to claim 7, wherein:
(a) the coaxial nested shells are axially adjustable relative to each other.

* * * * *